350-1.6
OR 3,269,267
SEARCH ROOM

Aug. 30, 1966 R. D. COLLINS 3,269,267
SUNGLASSES WITH ALIGNED INFRA-RED, PHOTOCHROMIC AND ULTRAVIOLET FILTERS
Filed Nov. 19, 1962 2 Sheets-Sheet 1

INVENTOR
ROBERT D. COLLINS
BY Louis A. Kline
Justin S. [illegible]
HIS ATTORNEYS Aug. 30, 1966 R. D. COLLINS 3,269,267
SUNGLASSES WITH ALIGNED INFRA-RED, PHOTOCHROMIC AND ULTRAVIOLET FILTERS
Filed Nov. 19, 1962 2 Sheets-Sheet 2

INVENTOR
ROBERT D. COLLINS
BY Louis A. Kling
Justin S. Compton
HIS ATTORNEYS

United States Patent Office 3,269,267 Patented August 30, 1966

3,269,267
SUNGLASSES WITH ALIGNED INFRA-RED, PHOTOCHROMIC AND ULTRAVIOLET FILTERS

Robert D. Collins, Dayton, Ohio, assignor to The National Cash Register Company, Dayton, Ohio, a corporation of Maryland Filed Nov. 19, 1962, Ser. No. 238,344
1 Claim. (Cl. 88—112)

This invention relates to ultra-violet-ray-operated sunglasses, and more particularly pertains to such having the characteristic that full, unimpeded solar radiation, or lesser radiation within the solar spectrum but rich in ultra-violet components, switches them from a condition of substantial visual transparency to a light-filtering condition in which they become opaque to eye-harmful radiation, and having the added characteristic that radiation less rich in ultra-violet radiation, or darkness, permits them to revert automatically to a substantially visually-transparent condition.

While the invention finds special use in the protection of human eyes against eye-harmlul unfiltered solar radiation encountered in outer space, the novel optical system is adapted to protect other things harmed by full solar exposure. The novel optical system also protects against exposure to solar rays that have been filtered by passage through air, and gives protection against artificially-produced radiation of the solar spectrum range or radiations lesser in intensity or of lesser band-width.

A description of a single optical system will serve to describe the invention, although two such systems may be provided with appropriate face-sealing elements in a single mounting to serve as a pair of protective eye spectacles.

The automatic operation of the novel optical system is brought about by the effect of a determined amount of ultra-violet light upon a normally substantially transparent optical element furnished with, as the activatable component, a chemical material of photochromic properties. This activatable element is positioned optically behind an interference filter that is transparent to visible radiation but which filters out a large part of the incident infra-red radiation, without itself being heated thereby. Preferably, there also is provided in the rear of the photochromic element, with respect to incident light, a filter element substantially transparent to visible light but which filters out a large part of the ultra-violet radiation that may not be absorbed by and passes through the infra-red element and the photochromic element.

For the purposes of describing this invention, an eye-protecting photochromic material may be defined as one in which at least one chemical compound is provided that has at least two molecular configurations, one of which configurations absorbs, especially, a rather wide band of the visible spectrum, and the other of which configurations does not absorb that radiation band. For the purpose in mind of protecting the eyes of a human being against temporary blindness, from overexposure to high-energy visible light, the absorption band of the photochromic element should cover the complete visible spectrum down to the ultra-violet region, and to that end two or more photochromic compounds may be used in conjunction by mixture thereof or by use of multiple layers, so that, if the visible light absorption band of the colored state of one compound does not cover all of the visible spectrum, the other, or others, will complement it in that respect. That is to say, the eye-protecting photochromic material may consist of a number of photochromic compounds acting in concert. These eye-protecting photochromic compounds are subject to being forced to the light-absorbing state, for a time, by irradiation of them, while in solution, liquid or solid, with ultra-violet light rays, such light-absorbing condition persisting as long as such incident radiation in the necessary amount continues, but, in the absence or insufficiency of such radiation, such compounds revert to the non-radiation-absorbing, or "clear," condition on account of the ambient temperature. The photochromic compounds in solution change toward one configuration or the other, molecule by molecule, the ultra-violet rays tending to force the molecules to the light-absorbing state as they are struck, and ambient heat in conducted or radiant form as infra-red rays (including the longer portions of the visible spectrum) tending to force the molecules back to the non-light-absorbing state, the predominance of one or the other of the states in the molecules of a mass controlling the overall light-absorbing characteristics of the optical system in which they are used. The ambient factor involved in the molecular switching is absolute temperature, the higher the temperature the faster the rate of return of the photochromic compound molecules to the light-non-absorbing state, the half-like being measured by a photometer. Thus, infra-red radiation and conducted heat tend to "clear" the optical system, and ultra-violet light tends to "darken" it. Fortunately, there is a wide choice of these photochromic materials as regards response, and selection from amongst them is made in view of the temperature range intended as the environment of use and degree of light-filtering response to ultra-violet and infra-red radiation required. The preferred materials for space use are strongly protective against full solar radiation, which, incidentally, also is strong in the reversing infra-red radiation, and quickly revert to the "clear" condition in its absence at temperatures compatible with human life. Therefore, the photochromic element is protected by the infra-red filter to assist in its quick switching to the "dark" state. As a further action, the infra-red filter protects the eyes as well as the photochromic material.

Simple sunglasses of the type having photochromic compounds associated therewith are described in an application for United States Letters Patent, Serial No. 827,420, filed July 14, 1959, by Elliot Berman, assigned to the assignee of this application but now abandoned, but these are not provided with front (i.e., on the light-incident side) and rear filters, respectively, of infra-red-absorbing and ultra-violet-absorbing characteristics, and, therefore, there is provided by this invention a new system of fixed filters having interposed an automatically-operative filter including photochromic compounds selected as required for ultimate use, whether the light is of solar origin or not.

Referring to the drawings:

FIG. 1 is a view of a goggles frame 20, showing in the eye-aperture 21 a combination of three filter optical units comprising a fixed interference-type of infra-red filter 22, which may be visually clear or tinted as desired; a photochromic filter 23, normally clear or tinted as desired, which is forced to a visible light-absorbing condition by incidence of ultra-violet light but which reverts to its clear or tinted condition, as the case may be, on relaxation of the incident ultra-violet light or the cessation thereof, or the application of applied erasing heat applied by collateral radiant or conductive means; and a clear or tinted broad-band ultra-violet light filter 24, to catch any excess incident ultra-violet radiation not absorbed by the photochromic filter element 23 in case of a change of state therein.

FIG. 2 is a cross-section on the line 2—2 of FIG. 1, showing the photochromic filter 23*a* of a liquid cell type in which the photochromic compound or compounds are dissolved in a liquid. Photochromic compounds are easily switched to their different molecular configurations when in solution, either a liquid solution or a solid solution, and, therefore, the photochromic element may be a solid plate of film material having dissolved in it the photochromic material as shown at 23 in FIG. 1, or it may be a flat-sided cell containing the photochromic material in liquid solution as shown at 23*a* in FIG. 2, or a combination of both.

Figures 1, 2, 3:
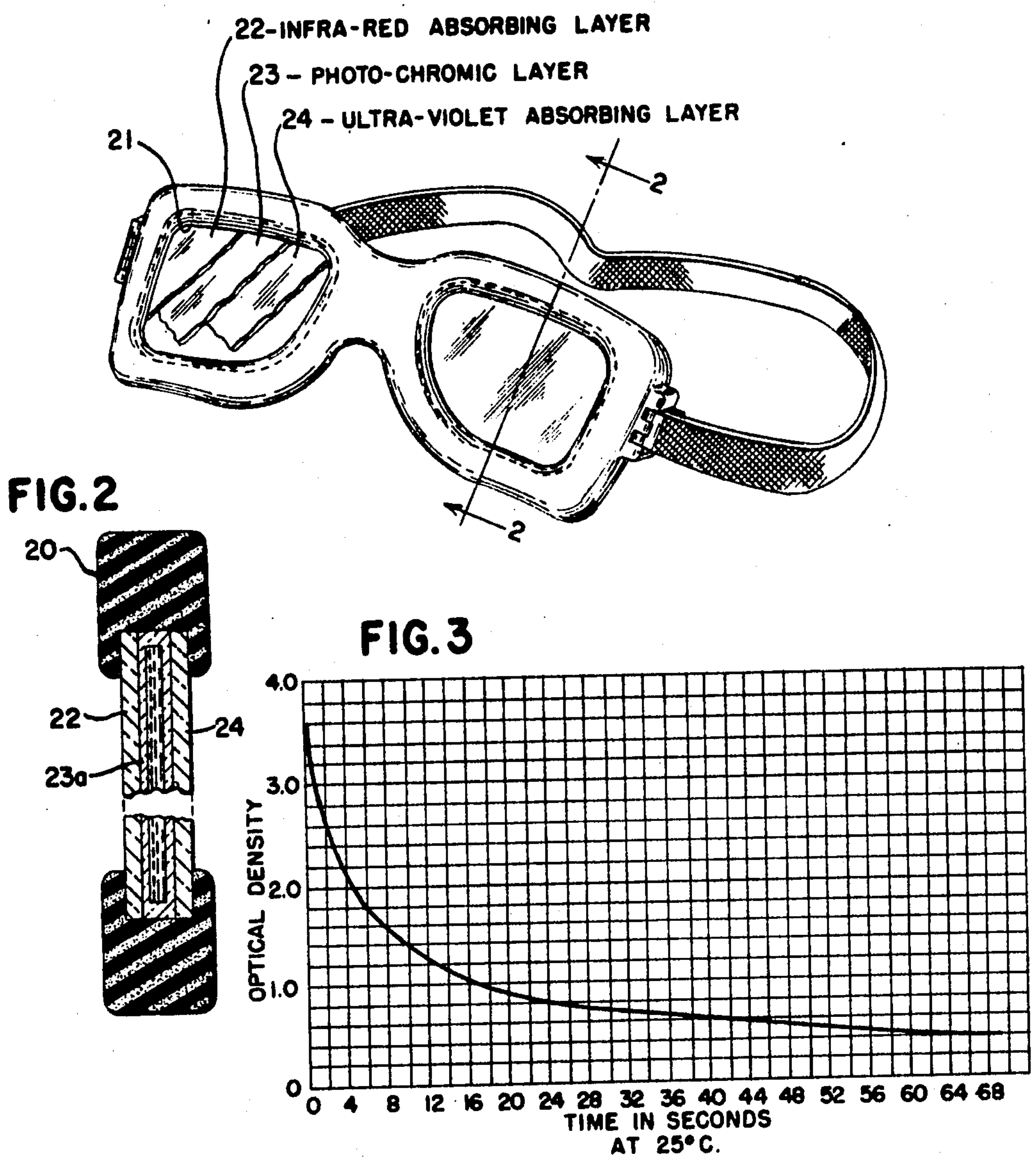
FIG. 3 is a typical curve showing the effect of ambient temperature in causing the decrease in density of the preferred photochromic optical element after cessation of incident ultra-violet light produced by a xenon-filled flash lamp used to simulate solar radiation.
Figure 4:
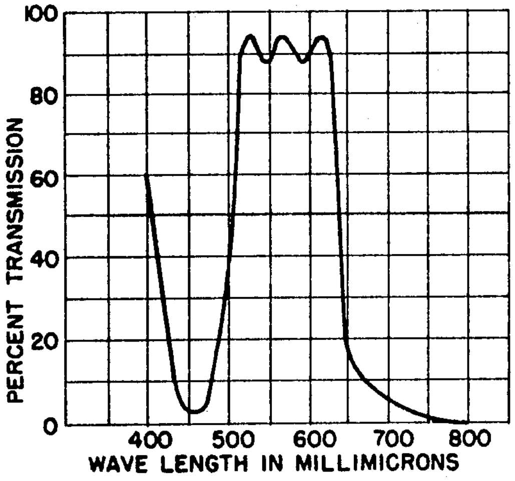
FIG. 4 is a graph of the light-transmission characteristics of a visually "clear" fixed filter for infra-red light, of a typical interference type, Bausch & Lomb filter BL 90–3–560.
Figure 5:
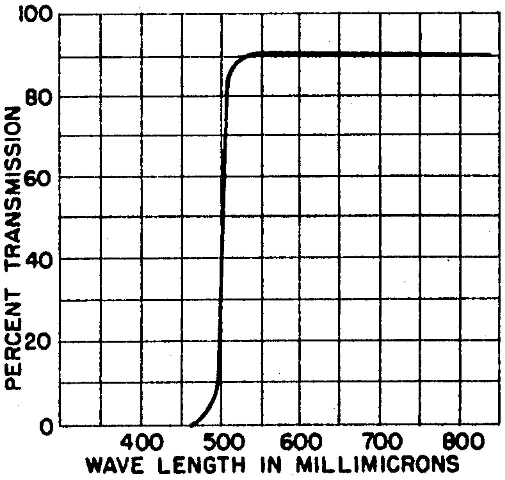
FIG. 5 is a graph of the light transmission characteristics of a visually "clear" fixed filter for ultra-violet light, typified by a Jena GG14A filter.
Figure 6:
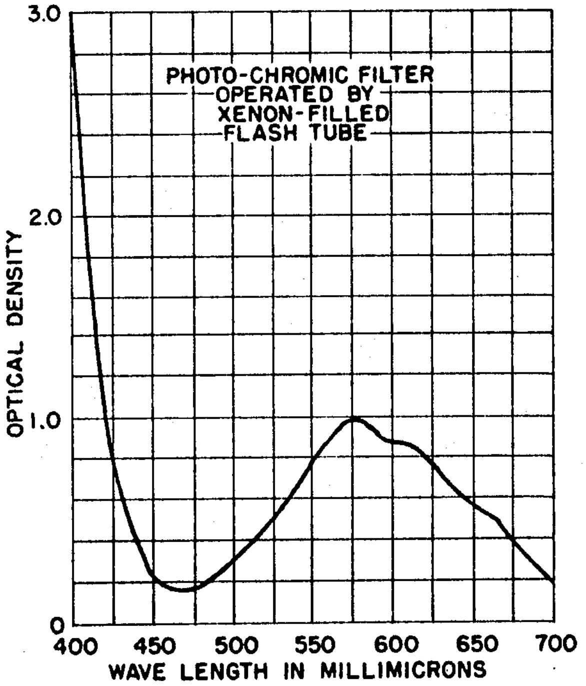
FIG. 6 is a graph of the light-transmission characteristics of a photochromic filter flashed with a xenon-filled lamp, an FX–1, the "optical density" being logarithm, base 10, of the inverse of the transmittance of the filtering effect.

The preferred embodiment of the invention includes front and rear filters having transmission characteristics substantially like those of FIGS. 4 and 5, which leave a normal transmission gap in the range of 425 to 500 which is effectively occluded by the middle photochromic element when forced to the colored condition by the excess of ultra-violet-light-induced mass molecular change over the reversing effect of an ambient temperature of 20 to 25 degrees centigrade. This photochromic middle element is a dried solution film of photochromic dyes in polymethylmethacrylate made from drying the following solution:

| | Parts/weight |
|---|---|
| Photochromic dye I | 0.70 |
| Photochromic dye II | 0.70 |
| Photochromic dye III | 0.70 |
| Acryloid B72 | 30.00 |
| Toluene | 67.90 |
| | 100.00 |

coated on a transparent support sheet and dried to give a film 0.001 of an inch in thickness.

The dyes I, II, and III are derivatives of the compound

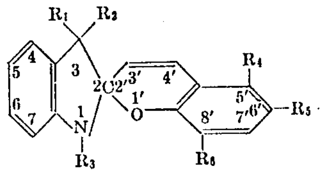

to wit:

| | $R_1$ | $R_2$ | $R_3$ | $R_4$ | $R_5$ | $R_6$ |
|---|---|---|---|---|---|---|
| I | $CH_3$ | $CH_3$ | $\phi$ | Br | $NO_2$ | $OCH_3$ |
| II | $\phi$ | n-propyl | $CH_3$ | H | $NO_2$ | H |
| III | $CH_3$ | $CH_3$ | $\phi$ | H | $NO_2$ | $OCH_3$ |

"Acryloid B72" is a polyester of acrylic and methacrylic acids, having a specific gravity of 1.19 and having in a 40 percent solution in toluene a viscosity of 500–1100 centipoises at 30 degrees centigrade.

As to the dyes, where all the R's of the base compound are H, coloration by ultra-violet radiation is only possible at temperatures of the order of −60 degrees centigrade because the reversion rate is faster than the coloration rate above that temperature. The selected substituents tend to slow down this reversion rate until a correct balance with the coloring rate is assured, with good overall occlusion of the portion of the spectrum not filtered out by the fixed filter layers on either side. Selection of substituents other than those named in dyes I, II, and III may be chosen from a very large number disclosed in the application for United States Letters Patent, Serial No. 827,420, to which reference has been made above, to obtain through trial and error a combination of filter properties and color densities compatible with the use to be made of the final product with respect to incident radiation.

If the novel filter device is reversed when applied in front of the eye, the incident light will be filtered of ultra-violet light first, thus keeping the device visually clear. Thus the goggles may be reversely worn until wanted for their usual filtering purpose.

The invention resides not exclusively, as in the preferred embodiment, to a particular combination of photochromic dyes, but broadly in the use of a photochromic dye layer filter element for the visible spectrum situate behind a fixed infra-red-absorbing element and, if desired, in combination also with a fixed ultra-violet filter behind, all with respect to the incident solar light to be controlled. The device may be useful also where the ultraviolet filter element is omitted as not necessary in view of the protection desired.

What is claimed is:

A sunglass device having two modes of application to the eyes of a user, including combination (a) a three-element optical system including in alinement optically (1) an infra-red reflecting filter capable of passing visible and ultraviolet light, (2) a photochromic filter, including photochromic dye in solution, normally passing visible light but becoming substantially opaque thereto under the influence of ultraviolet light and (3) an ultraviolet light absorbing filter passing visible light; and (b) reversible mounting means to hold system (a) before the eyes in a first mode where incident light first strikes filter (1) of system (a), and which mounting means is reversible at will to a second mode where system (a) is held before the eyes so incident light first strikes filter (3), whereby in said first mode, the user is protected against harmful solar radiation containing eye-harmful ultraviolet, visible and infra-red components, and in said second mode, the photochromic filter remains in a condition to pass visible light.

References Cited by the Examiner

UNITED STATES PATENTS

| | | | |
|---|---|---|---|
| 1,222,049 | 4/1917 | Tillyer | 351—163 |
| 1,678,218 | 7/1928 | Gruss. | |
| 2,444,976 | 7/1948 | Brown. | |
| 2,710,274 | 6/1955 | Kuehl. | |
| 2,871,371 | 1/1959 | Gray. | |
| 3,069,301 | 12/1962 | Buckley et al. | 88—112 X |
| 3,152,215 | 10/1964 | Barstow et al. | 88—61 |

FOREIGN PATENTS

| | | |
|---|---|---|
| 1,218,574 | 12/1959 | France. |
| 1,269,822 | 7/1961 | France. |
| 716,153 | 1/1942 | Germany. |
| 729,861 | 5/1955 | Great Britain. |
| 730,640 | 5/1955 | Great Britain. |
| 521,268 | 3/1955 | Italy. |

DAVID H. RUBIN, *Primary Examiner.*